United States Patent [19]
Kuo et al.

[11] Patent Number: 5,304,001
[45] Date of Patent: Apr. 19, 1994

[54] METHOD AND APPARATUS FOR METERING AND MIXING NON-COMPRESSIBLE AND COMPRESSIBLE FLUIDS

[75] Inventors: Alex C. Kuo; Kenneth A. Nielsen, both of Charleston; James A. Condron, Hurricane; Kenneth L. Hoy, St. Albans, all of W. Va.

[73] Assignee: Union Carbide Chemicals and Plastics Technology Corporation, Danbury, Conn.

[21] Appl. No.: 873,675

[22] Filed: Apr. 24, 1992

Related U.S. Application Data

[63] Continuation of Ser. No. 413,517, Sep. 27, 1989.

[51] Int. Cl.$^5$ .............................. B01F 15/04
[52] U.S. Cl. .................. 366/132; 366/151; 366/160; 366/348
[58] Field of Search ............... 366/132, 131, 133, 134, 366/136, 125, 2, 162, 151, 160, 348; 73/861.38

[56] References Cited

U.S. PATENT DOCUMENTS

| | | | |
|---|---|---|---|
| 3,687,369 | 8/1972 | Johnstone | 366/124 |
| 4,422,338 | 12/1983 | Smith | 73/861.38 |
| 4,621,927 | 11/1986 | Hiroi | 366/132 |
| 4,729,243 | 3/1988 | Friedland et al. | 73/861.38 |
| 4,892,410 | 1/1990 | Snow et al. | 366/2 |
| 4,976,546 | 12/1990 | Beattie | 366/162 |

*Primary Examiner*—Stephen F. Gerrity
*Assistant Examiner*—Patrick F. Brinson
*Attorney, Agent, or Firm*—J. B. Mauro

[57] ABSTRACT

The present invention is directed to methods and apparatus for effectively proportionating a mixture of compressible and non-compressible fluids and in particular, the present invention is directed to apparatus and methods for forming a coating composition mixture containing a substantially accurate proportionated amount of at least one supercritical fluid used as a viscosity reduction diluent.

11 Claims, 5 Drawing Sheets

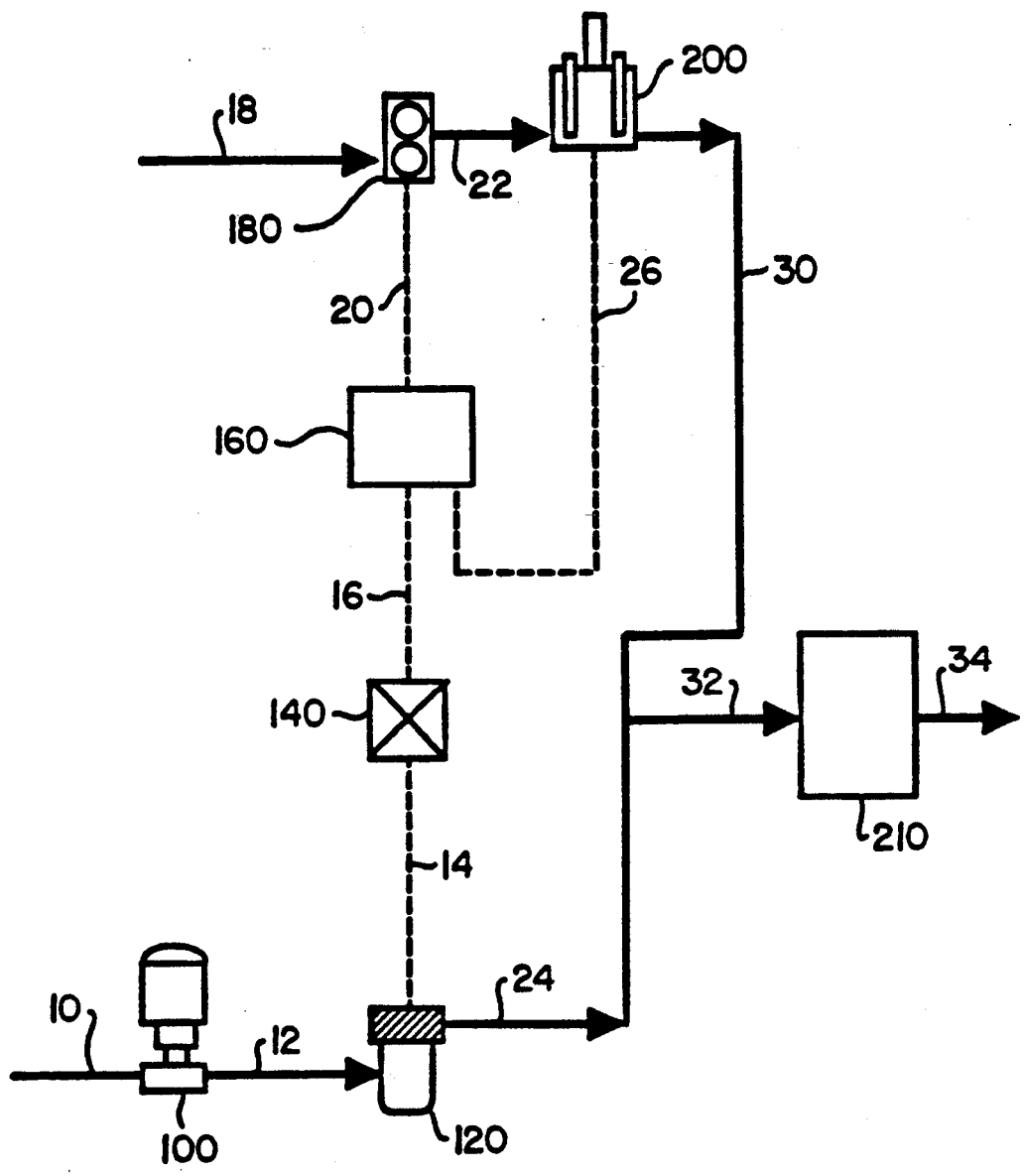
F I G. 2

METHOD AND APPARATUS FOR METERING AND MIXING NON-COMPRESSIBLE AND COMPRESSIBLE FLUIDS

This application is a continuation of prior U.S. application Ser. No. 413,517 filing date Sept. 27, 1989.

RELATED PATENT APPLICATIONS

This application contains subject matter related to U.S. application Ser. No. 133,068, filed Dec. 21, 1987, which application is a continuation-in-part of Application Ser. No. 883,156, filed Jul. 8, 1986, now abandoned. This application also contains subject matter related to U.S. patent applications Ser. No. 218,896, filed Jul. 14, 1988 and Ser. No. 218,910, filed Jul. 14, 1988.

FIELD OF THE INVENTION

This invention, in its more broader embodiment, pertains to the field of effectively proportionating a mixture of compressible and non-compressible fluids. More specifically, the present invention, in its more preferred embodiments, is directed to apparatus and methods for forming a coating composition mixture containing a substantially accurate proportionated amount of at least one supercritical fluid used as a viscosity reduction diluent. The resultant admixed properly proportionated fluid mixture can then be sprayed onto a subtrate to be coated.

BACKGROUND OF THE INVENTION

Prior to the inventions described in the aforementioned related patent applications, the liquid spray application of coatings, such as lacquers, enamels and varnishes, was effected solely through the use of organic solvents as viscosity reduction diluents. However, because of increased environmental concern, efforts have been directed to reducing the pollution resulting from painting and finishing operations. For this reason there has been a great deal of emphasis placed on the development of new coatings technologies which diminish the emission of organic solvent vapors. A number of technologies have emerged as having met most but not all of the performance and application requirements, and at the same time meeting emission requirements and regulations. They are: (a) powder coatings, (b) water-borne dispersions, (c) water-borne solutions, (d) non-aqueous dispersions, and (e) high solids coatings. Each of these technologies has been employed in certain applications and each has found a niche in a particular industry. However, at the present time, none has provided the performance and application properties that were initially expected.

Powder coatings, for example, while providing ultra low emission of organic vapors, are characterized by poor gloss or good gloss with heavy orange peel, poor distinctness of image gloss (DOI), and poor film uniformity. Moreover, to obtain even these limited performance properties generally requires excessive film thicknesses and/or high curing temperatures. Pigmentation of powder coatings is often difficult, requiring at times milling and extrusion of the polymer-pigment composite mixture followed by cryogenic grinding. In addition, changing colors of the coating often requires its complete cleaning, because of dust contamination of the application equipment and finishing area.

Water-borne coatings are very difficult to apply under conditions of high relative humidity without serious coating defects. These defects result from the fact that under conditions of high humidity, water evaporates more slowly than the organic cosolvents of the coalescing aid, and as might be expected in the case of aqueous dispersions, the loss of the organic cosolvent/coalescing aid interferes with film formation. Poor gloss, poor uniformity, and pin holes unfortunately often result. Additionally, water-borne coatings are not as resistant to corrosive environments as are the more conventional solvent borne coatings.

Coatings applied with organic solvents at high solids levels avoid many of the pitfalls of powder and water-borne coatings. However, in these systems the molecular weight of the polymer has been decreased and reactive functionality has been incorporated therein so that further polymerization and crosslinking can take place after the coating has been applied. It has been hoped that this type of coating will meet the ever-increasing regulatory requirements and yet meet the most exacting coatings performance demands. However, there is a limit as to the ability of this technology to meet the performance requirement of a commercial coating operation. Present high solids systems have difficulty in application to vertical surfaces without running and sagging of the coating. Often, they are also prone to cratering and pin holing of the coating. If they possess good reactivity, they often have poor shelf and pot life. However, if they have adequate shelf stability, they cure and/or crosslink slowly or require high temperature to effect an adequate coating on the substrate.

Clearly, what is needed is an environmentally safe, non-polluting diluent that can be used to thin very highly viscous polymer and coatings compositions to liquid spray application consistency. Such a diluent would allow utilization of the best aspects of organic solvent borne coatings applications and performance while reducing the environmental concerns to an acceptable level. Such a coating system could meet the requirements of shop- and field-applied liquid spray coatings as well as factory-applied finishes and still be in compliance with environmental regulations.

Such a needed diluent has now been found and is discussed in the aforementioned related applications which teach, among other things, the utilization of supercritical fluids, such as supercritical carbon dioxide fluid, as diluents in highly viscous organic solvent borne and/or highly viscous non-aqueous dispersion coating compositions to dilute these compositions to application viscosity required for liquid spray techniques.

U.S. patent application Ser. No. 133,068, filed Dec. 21, 1987, to Hoy, et al., discloses processes and apparatus for the liquid spray application of coatings to a substrate that minimize the use of environmentally undesirable organic diluents. The broadest process embodiment of that application involves:

(1) forming a liquid mixture in a closed system, said liquid mixture comprising:
  (a) at least one polymeric compound capable of forming a coating on a substrate; and
  (b) at least one supercritical fluid, in at least an amount which when added to (a) is sufficient to render the viscosity of said mixture of (a) and (b) to a point suitable for spray application; and
(2) spraying said liquid mixture onto a substrate to form a liquid coating thereon.

That application is also directed to a liquid spray process in which at least one active organic solvent (c) is admixed with (a) and (b) above prior to the liquid spray application of the resulting mixture to a substrate. The preferred supercritical fluid is supercritical carbon dioxide. The process employs an apparatus in which the mixture of the components of the liquid spray mixture can be blended and sprayed onto an appropriate substrate. The apparatus contains:

(1) means for supplying at least one polymeric compound capable of forming a continuous, adherent coating;

(2) means for supplying at least one active organic solvent;

(3) means for supplying supercritical carbon dioxide fluid;

(4) means for forming a liquid mixture of components supplied from (1)-(3); and (5) means for spraying said liquid mixture onto a substrate.

The apparatus may also provide for (6) means for heating any of said components and/or said liquid mixture of components. U.S. patent application Ser. No. 133,068 demonstrates the use of supercritical fluids, such as supercritical carbon dioxide fluid, as diluents in highly viscous organic solvent borne and/or highly viscous non-aqueous dispersions coatings compositions to dilute the compositions to application viscosity required for liquid spray techniques. It further demonstrates that the method is generally applicable to all organic solvent-borne coatings systems.

Copending U.S. application Ser. No. 218,910, filed Jul. 14, 1988, is directed to a liquid coatings application process and apparatus in which supercritical fluids, such as supercritical carbon dioxide fluid, are used to reduce to application consistency, viscous coatings compositions to allow for their application as liquid sprays. The coatings compositions are sprayed by passing the composition under pressure through an orifice into the environment of the substrate.

In particular, the process of U.S. application Ser. No. 218,910 for liquid spray (1) forming a liquid mixture in a closed system, said liquid mixture comprising:
  (a) at least one polymeric component capable of forming a coating on a substrate; and
  (b) a solvent component containing at least one supercritical fluid, in at least an amount which when added to (a) is sufficient to render the viscosity of said mixture to a point suitable for spray application; and (2) spraying said liquid mixture onto a substrate to form a liquid coating thereon by passing the mixture under pressure through an orifice into the environment of the substrate to form a liquid spray.

U.S. application Ser. No. 218,895, filed Jul. 14, 1988, is directed to a process and apparatus for coating substrates by a liquid spray in which 1) supercritical fluid, such as supercritical carbon dioxide fluid, is used as a viscosity reduction diluent for coating formulations, 2) the mixture of supercritical fluid and coating formulation is passed under pressure through an orifice into the environment of the substrate to form the liquid spray, and 3) the liquid spray is electrically charged by a high electrical voltage relative to the substrate.

In particular, the process of U.S. application Ser. No. 218,895 for electrostatic liquid spray application of coatings to a substrate comprises:

(1) forming a liquid mixture in a closed system, said liquid mixture comprising:
  (a) at least one polymeric component capable of forming a coating on a substrate; and
  (b) a solvent component containing at least one supercritical fluid, in at least an amount which when added to (a) is sufficient to render the viscosity of said mixture to a point suitable for spray application;

(2) spraying said liquid mixture onto a substrate to form a liquid coating thereon by passing the mixture under pressure through an orifice into the environment of the substrate to form a liquid spray; and (3) electrically charging said liquid spray by a high electrical voltage relative to the substrate and electric current.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

Because of its relevancy to the present invention, a brief discussion of supercritical fluid phenomena is believed to be warranted.

Supercritical fluid phenomenon is well documented, see pages F-62–F-64 of the CRC Handbook of Chemistry and Physics, 67th Edition, 1986-1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" in the transition point at which the liquid and gaseous states of a substance merge into each other and represents the combination of the critical temperature and critical pressure for a given substance. The "critical temperature", as used herein, is defined as the temperature above which a gas cannot be liquefied by an increase in pressure. The "critical pressure", as used herein, is defined as that pressure which is just sufficient to cause the appearance of two phases at the critical temperature.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the present invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are given in Table 1.

TABLE 1

EXAMPLES OF SUPERCRITICAL SOLVENTS

| Compound | Boiling Point (°C.) | Critical Temperature (°C.) | Critical Pressure (atm) | Critical Density (g/cm$^3$) |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability and low critical temperature of carbon dioxide, supercritical carbon dioxide fluid is preferably used with the coating formulations. For many of the same reasons, nitrous oxide ($N_2O$) is a desirable supercritical fluid for admixture with the coating formulations. However, any of the aforementioned supercritical fluids and mixtures thereof are to be considered as being applicable for use with the coating formulations.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

Due to the solvency of the supercritical fluid with the coating formulations, a single phase liquid mixture is formed which is capable of being sprayed by airless spray techniques.

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

In essentially every process in which a mixture is prepared for a particular purpose, the constituents of that mixture usually need to be present in particular, proportionated amounts in order for the mixture to be effective for its intended use. In the aforementioned related patent applications, the underlying objective is to reduce the amount of organic solvent present in a coating formulation by the use of supercritical fluid. Understandably, with this objective in mind, it is generally desirable to utilize as much supercritical fluid as possible while still retaining the ability to effectively spray the liquid mixture of coating formulation and supercritical fluid and also obtain a desirable coating on the substrate. Accordingly, here too, it is particularly preferred that there be prescribed, proportionated amounts of supercritical fluid and of coating formulation present in the liquid coating mixture to be sprayed.

Generally, the preferred upper limit of supercritical fluid addition is that which is capable of being miscible with the coating formulation. This practical upper limit is generally recognizable when the admixture containing coating formulation and supercritical fluid breaks down from one phase into two fluid phases.

To better understand this phenomenon, reference is made to the phase diagram in FIG. 1 wherein the supercritical fluid is supercritical carbon dioxide fluid. In FIG. 1, the vertices of the triangular diagram represent the pure components of an admixed coating formulation which for the purpose of this discussion contains no water. Vertex A is an organic solvent, vertex B is carbon dioxide, and vertex C represents a polymeric material. The curved line BFC represents the phase boundary between one phase and two phases. The point D represents a possible composition of a coating formulation in which supercritical carbon dioxide has not been added. The point E represents a possible composition of an admixed coating formulation, after admixture with supercritical carbon dioxide.

Thus, after atomization, a majority of the carbon dioxide vaporizes, leaving substantially the composition of the original coating formulation. Upon contacting the substrate, the remaining liquid mixture of the polymer and solvent(s) component(s) will flow, i.e., coalesce, to produce a uniform, smooth film on the substrate. The film forming pathway is illustrated in FIG. 1 by the line segments EE'D (atomization and decompression) and DC (coalescence and film formation).

However, the amount of supercritical fluid, such as supercritical carbon dioxide, that can be mixed with a coating formulation is generally a function of the miscibility of the supercritical fluid with the coating formulation as can best be visualized by referring to FIG. 1.

As can be seen from the phase diagram, particularly as shown by arrow 10, as more and more supercritical carbon dioxide is added to the coating formulation, the composition of the admixed liquid coating mixture approaches the two-phase boundary represented by line BFC. If enough supercritical carbon dioxide is added, the two-phase region is reached and the composition correspondingly breaks down into two fluid phases. Sometimes, it may be desirable to admix an amount of supercritical fluid (in this case, supercritical carbon dioxide) which is even beyond the two phase boundary. Generally, however, it is not preferable to go much beyond this two phase boundary for optimum spraying performance and/or coating formation.

In addition to avoiding the two-phase state of the supercritical fluid and the coating formulation, proper proportionation is also desirable to provide optimum spraying conditions, such as, formation of desired admixed viscosity, formation of desired particle size, formation of desired sprayed fan shape, and the like.

Accordingly, in order to spray liquid coating formulations containing supercritical fluid as a diluent on a continuous, semi-continuous, and/or an intermittent or periodic on-demand basis, it is necessary to prepare such liquid coating formulations in response to such spraying by accurately mixing a proportioned amount of the coating formulation with the supercritical fluid. However, the compressiblity of supercritical fluids is much greater than that of liquids. Consequently, a small change in pressure results in large changes in the density of the supercritical fluid.

The compressibility of the supercritical fluids causes the flow of these materials, through a conduit and/or pump, to oscillate or fluctuate. As a result, when mixed with the coating formulation, the proportion of supercritical fluid in the resulting admixed coating formulation also correspondingly oscillates or fluctuates instead of being uniform and constant. Moreover, the compressibility of liquid carbon dioxide at ambient temperature is high enough to cause flow oscillations and fluctuations to occur when using reciprocating pumps to pump and proportion the carbon dioxide with the coating formulation to form the admixed coating formulation. This particularly occurs when the volume of liquid carbon dioxide in the flow path between the pump and the mixing point with the coating formulation is too large. The oscillation can be promoted or accentuated by any pressure variation that occurs during the reciprocating pump cycle.

In an embodiment discussed in a number of the aforementioned related patent applications, an apparatus is disclosed for pumping and proportionating a non-compressible fluid, i.e., a coating formulation with a compressible fluid, liquid carbon dioxide, for example, in order to prepare the ultimate mixture to be sprayed comprised of the coating formulation and the carbon dioxide in its supercritical state. In that embodiment, volumetric proportionating of the coating formulation stream and the liquid carbon dioxide stream is carried out by means of reciprocating pumps which displace a volume of fluid from the pump during each one of its pumping cycles. One reciprocating pump is used to pump the coating formulation which is slaved to another reciprocating pump which is used to pump the liquid carbon dioxide. The piston rods for each pump are attached to opposite ends of a shaft that pivots up and down on a center fulcrum. The volume ratio is varied by sliding one pump along the shaft, which changes the stroke length.

However, liquid carbon dioxide is relatively compressible at ambient temperature, the temperature at which it is typically stored in a pressurized container. Such compressibility may undesirably cause fluctuations and oscillations of the amount of carbon dioxide that is present in the admixed coating formulation that is to be sprayed. This occurs due to the incompatible pumping characteristics of the relatively non-compressible coating formulation and the relatively compressible liquid carbon dioxide. With the coating formulation, pressure is immediately generated in the reciprocating pump as soon as its volume is displaced. Inasmuch as the liquid carbon dioxide is substantially compressible, a larger volume is needed to be displaced in order to generate the same pressure. Because mixing occurs when the flow of the coating formulation and of the liquid carbon dioxide are at the same pressure, the flow rate of carbon dioxide lags behind the flow rate of the coating formulation.

This oscillation is accentuated if the driving force operating the pump varies during the operating cycle, such as an air motor changing direction during its cycle. Thus, if the driving force declines, the pressure in the coating formulation flow declines even more rapidly, due to its non-compressibility, than the pressue in the liquid carbon dioxide flow, due to its being compressible.

Accordingly, the pressures generated in both flows may be out of phase during the pumping cycle, such that the proportion of carbon dioxide in the mixture to be sprayed also varies. This oscillation is made even more severe if cavitation also occurs in the carbon dioxide pump due to vapor formation as the pump fills.

While some of these fluctuation and oscillation problems have been suppressed by refrigerating the liquid carbon dioxide to low temperatures, such as below 10° C., and even below 0° C., prior to its entering the reciprocating pump, a need still exists to avoid substantially all inaccuracies that may be present in the proportionation of the non-compressible coating formulation and the compressible liquid carbon dioxide to form the desired admixture. Indeed, a need exists to provide a means to accurately proportion any compressible fluid with a non-compressible fluid.

SUMMARY OF THE INVENTION

By virtue of the present invention, the above needs have now been met. Methods and apparatus have been discovered which are capable of accurately and continuously providing a proportionated mixture comprised of a non-compressible fluid and a compressible fluid.

In particular, rather than utilizing the volumetric proportionation apparatus discussed above, the present invention relies upon mass proportionation to obtain the desired mixture of the compressible and non-compressible fluids and does so in a very simple and elegant manner. Specifically, the mass flow rate of the compressible fluid is continuously and instantaneously measured. Regardless of what that flow rate is and whether or not it is oscillating as a result of, for example, being pumped by a reciprocating pump or regardless of the state in which such compressible fluid is in, that mass flow rate information is fed to a signal processor on a continuous and instantaneous manner. Based on that received information, the signal processor, in response to the amount of compressible fluid that has been measured, controls a metering device which controls the rate of flow of the non-compressible fluid. The non-compressible fluid is then metered in a precise predetermined proportion relative to the compressible fluid flow rate such that when the compressible and non-compressible fluids are subsequently mixed, they are present in the admixed coating formulation in the proper proportions.

As used herein the phrase "compressible fluid" is meant to include a material whose density is affected by a change in pressure to an extent of at least about 2%.

More specifically, the present invention in its broader embodiment comprises an apparatus for continuously mixing a substantially compressible fluid and a substantially non-compressible fluid in a predetermined proportion which includes:

a) means for supplying substantially compressible fluid;

b) means for measuring the mass flow rate of the substantially compressible fluid;

c) means for generating a signal in response to the measured mass flow rate of the substantially compressible fluid;

d) means for supplying substantially non-compressible fluid;

e) means for controlling the flow rate of the substantially non-compressible fluid responsive to the signal generated in (c); and f) means for forming a mixture of the measured compressible fluid and the controlled non-compressible fluid.

The present invention also comprises a method for forming a mixture of a substantially compressible fluid and a substantially non-compressible fluid in a predetermined proportion which comprises:

a) supplying substantially compressible fluid;

b) measuring the mass flow rate of the substantially compressible fluid;

c) generating a signal in response to the measured mass flow rate of the substantially compressible fluid;

d) supplying substantially non-compressible fluid;

e) controlling the flow rate of the substantially non-compressible fluid responsive to the signal generated in (c); and f) forming a mixture of the measured compressible fluid and the controlled non-compressible fluid.

By measuring the mass flow rate of the substantially compressible fluid, and then controlling the amount of non-compressible fluid in response thereto, the problems associated with the compressibility of the compressible fluid and the problems associated with phase changes of the compressible fluid, such as vaporization or condensation, are substantially eliminated. Any fluctuations or oscillations present in the flow of the compressible fluid are instantaneously measured and are compensated by controlling the amount of non-compressible fluid to provide the prescribed proportionation for the desired mixture. In contrast to past techniques, the present invention involves the metering, i.e., controlling the flow rate, of only one fluid, namely, the non-compressible fluid. The flow rate of the compressible fluid is not controlled, but rather, only measured, from which measurement the prescribed amount of non-compressible fluid is correspondingly adjusted to provide the desired proportionation.

This allows for total flexibility of the system and provides for a simple and effective means for producing the desired proportionated mixture of compressible and non-compressible fluids.

BRIEF DESCRIPTION OF THE DRAWINGS

FIG. 2 is a schematic diagram of one embodiment of the present invention showing the basic elements of the mass proportionation used in preparing a mixture of compressible and non-compressible fluids.

DETAILED DESCRIPTION OF THE INVENTION

Figure 1:
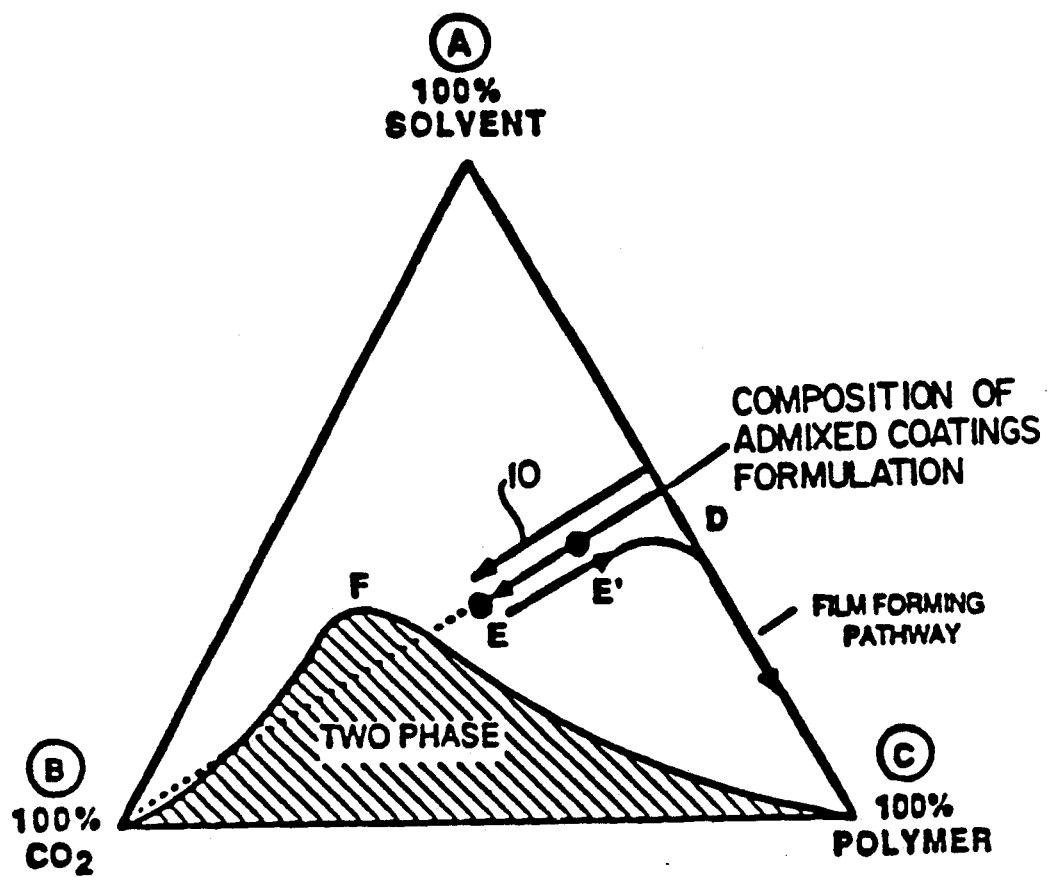
FIG. 1 is a phase diagram of a supercritical carbon dioxide fluid spray coating.

It is to be understood that while the following discussion will primarily focus upon providing a proportionated admixed liquid mixture of a coating formulation and supercritical fluid, such as carbon dioxide, which is suitable for being sprayed onto a substrate, the present invention is in no way limited to this embodiment. As is readily apparent from the foregoing discussion, the present invention encompasses the proportionation of any compressible and non-compressible fluid to form a desired mixture for any intended subsequent use.

Hence, aside from preparing an admixed liquid mixture comprising a coating formulation having a reduced amount of organic solvent by the use of supercritical fluid, the present invention is also able to prepare accurately proportionated mixtures of, for example, an aqueous coffee extract solution which is decaffeinated with supercritical carbon dioxide, which process is discussed in U.S. Pat. No. 4,348,422. Other mixtures of compressible and non-compressible fluids for alternative applications may also be prepared with the apparatus and methods of the present invention.

As used herein, the phrases "coating formulation" or "coating composition" are understood to mean a typical, conventional coating composition which does not have any supercritical fluid admixed therewith. Also as used herein, the phrases "admixed liquid mixture" or "admixed coating formulation" are meant to include an admixture of a coating formulation with at least one supercritical fluid.

Referring to FIG. 2, which shows a schematic diagram of the present invention in its most basic form, a compressible fluid which is to be proportionately mixed with a non-compressible fluid to form a desired admixture is introduced into line 10 from a supply source. From line 10, the compressible fluid is pumped by pumping means 100 through line 12 and past a means 120 for measuring the mass flow rate of the compressible fluid.

In the broad embodiment of the present invention, pumping means 100 is not narrowly critical to the present invention. It may comprise any kind of a pump that is capable of pumping a compressible fluid and it may be driven by any conventional means, for example, air drive or electrical means. For example, a conventional reciprocating pump which is well known to those skilled in the art is quite suitable.

Mass flow rate measuring means 120 can comprise any conventionally available mass flow rate measuring device such as a Micro Motion Model D mass flow meter manufactured by Micro Motion Inc. of Boulder, Colo. Generally, such mass flow rate measuring devices are known as coriolis meters. In contrast to most flow metering techniques which measure fluid volume, the measuring means of 120 measures mass flow. Relying on volume as a meaningful measuring device is inaccurate at best when dealing with compressible fluids. The volume of a compressible fluid may change, sometimes radically, in response to changing fluid temperature, pressure or composition. One property of a fluid which is unaffected by environmental conditions is its mass. It is this characteristic of the compressible fluid which is desirably measured and from which the rate of flow of the non-compressible fluid is controlled.

Typically, a mass flow meter such as the Micro Motion meters operates by vibrating a U-shaped sensor while the compressible fluid flows through it. The combination of fluid flow and tube vibration caused by such fluid flow creates a force which is detected by position sensors within the unit. This force is directly and linearly proportional to the mass flow rate.

In order for the overall system to continue proper proportionation, it is desirable that the amount of compressible fluid in the final mixture be at least about 2% by weight, more preferably at least about 5% by weight. This helps avoid major fluctuations in the non-compressible fluid flow based on insignifcant oscillations in the compressible fluid flow when such compressible fluid is present in an amount which is less than about 2% by weight in the final mixture.

The mass flow rate measured by measuring means 120 is electronically transmitted to a receiving device 140 via dotted line 14 which in turn sends out an electronic signal through dotted line 16 to electronic ratio controller 160. All of these electronic sensors and receivers are well known in the art and are not narrowly critical to the present invention.

Simultaneously, non-compressible fluid is supplied via line 18 to pumping means 180. Preferably, pumping means 180 is a positive displacement pump and even more preferably a precision gear pump which are known to those skilled in the art. Such pumps are capable of delivering substantially precise amounts of the non-compressible fluid on demand.

The ratio controller 160 contains logic circuitry which can be programmed to accept the electronic signal from device 140 and in turn generates a signal through dotted line 20 which controls the speed at which pump 180 operates. Correspondingly, the amount of non-compressible fluid that leaves pump 180 and enters line 22 is precisely controlled to a predetermined ratio relative to the amount of compressible fluid measured and passed into line 24.

Preferably, but not necessarily, the non-compressible fluid leaving pumping means 180 through line 22 is then passed into a measuring device 200 to measure the actual flow rate of the non-compressible fluid. The flow rate that is measured may be on a volumetric or mass flow rate basis. Such a measuring device may comprise, for example, a conventional precision gear meter such as is available from AW Company [Racine, Wis.]. The type of measuring device is not narrowly critical to the present invention. Since the material that is being measured is a substantially non-compressible fluid, its density will not materially vary over time. Accordingly, although what is being measured by this measuring device may be a volumetric flow rate, its accuracy here is quite acceptable in order to obtain an accurately proportioned final mixture. Alternatively, if desired, measuring device 200 may be placed in line 32, such that the flow rate of the mixture is measured and feedback signal transmitted to controller 160. This alternative embodiment measures the mixture flow rate at reduced viscosity thereby better facilitating the use of a mass flow meter.

The flow rate measured by measuring device 200 generates a flow feedback signal which is electronically received by the ratio controller 160 through dotted line 26. The controller compares the actual flow rate that is measured by measuring device 200 with the required flow rate needed to provide the desired ratio of non-compressible and compressible fluids based on its preset programming and makes any adjustments needed to the speed of pump 180 so as to obtain that required flow rate.

The non-compressible fluid leaving through line 30 and the compressible fluid leaving through line 24 enter mixing means 210 via line 32. Desirably, check valves (not shown) may be provided in each of lines 24 and 30 so as to prevent any backmixing. Of course, the respective fluids may be introduced into mixing means 210 by two separate lines (not shown) instead of the single line 32.

Mixing means 210 may comprise any effective mixing device capable of uniformly mixing the two fluids. Preferably, a conventional static mixer is utilized. The desired, accurately proportioned mixture of compressible and non-compressible fluid leaves the mixing means via line 34 for additional proccessing or final use, as required.

As discussed earlier, the present invention is particularly applicable although certainly not limited to being able to prepare an admixed liquid mixture of an accurately proportioned amount of supercritical fluid, particularly supercritical carbon dioxide, with a coating composition. As used herein, it will be understood that the pharase "precursor supercritical fluid" is a fluid, such as carbon dioxide, nitrous oxide, and the like, which is not in the supercritical state but which, as a result of being processed in the apparatus of the present invention, will enter into such supercritical state, and additionally includes material which is already in the supercritical state.

The present invention is not narrowly critical to the type of coating composition that can be sprayed provided that there is less than about 30% by weight of water, preferably less than about 20% by weight of water, in the solvent fraction (as herein later defined) of the formulation. Thus, essentially any coating formulation meeting the aforementioned water limit requirement which is conventionally sprayed with an airless spray technique may also be sprayed by means of the methods and apparatus of the present invention. Such coating formulations are typically used for painting and finishing operations or for applying various adhesives compositions, and the like. Such coating formulations may also include those that are typically utilized in the agricultural field in which fertilizers, weed killing agents, and the like are dispensed.

Generally, such coating formulations typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymer component which is well known to those skilled in the coatings art.

Generally, the materials used in the solids fraction of the present invention, such as the polymers, must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fraction, conventional additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the coating formulation to be sprayed by the methods of the present invention.

In connection with the use of the various additives noted above, it is particularly desirable for pigments to be present in the coating formulation inasmuch as it has been found to aid in the release of the supercritical fluid from the sprayed composition resulting in improved atomization.

In addition to the solids fraction, a solvent fraction is also typically employed in the coating compositions whether they be an adhesive composition or a paint, lacquer, varnish, or the like, or an agricultural spray, in order to act as a vehicle in which the solid fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight, may also be present in the solvent fraction provided that a coupling solvent is also present in the formulation. All such solvent fractions are suitable in the present invention.

A coupling solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used in the present invention include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethoxy ethanol. Also included are lactams such as n-methyl-2-pyrrolidone, and cyclic ureas such as dimethyl ethylene urea.

When water is not present in the coating formulation, a coupling solvent is not necessary, but may still be employed. Other solvents, particularly active solvents, which may be present in typical coating formulations and which may be utilized in the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., J. Phys. Chem. 58, 1099, 1954.

Of course, there are solvents which can function both as coupling solvents as well as active solvents and the one solvent may be used to accomplish both purposes. Such solvents include, for example, butoxy ethanol, propoxy ethanol and propoxy 2-propanol. Glycol ethers are particularly preferred.

Suitable additives that are conventionally present in coating formulations that are intended for spray application may also be present in this invention, such as, curing agents, plasticizers, surfactants, and the like.

Figure 3:
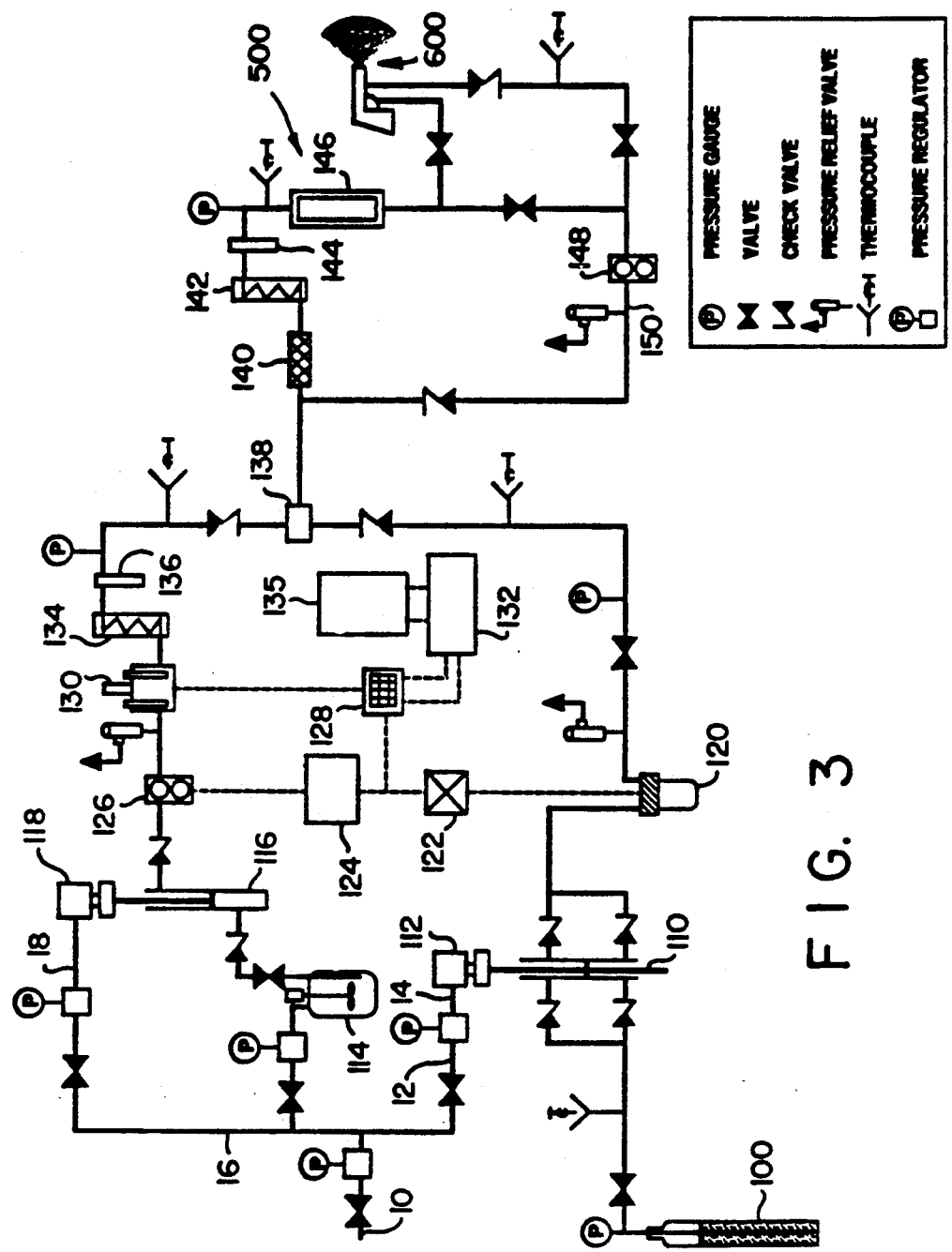
FIG. 3 is a schematic diagram of another embodiment of the present invention in which an accurately proportioned mixture of supercritical carbon dioxide and coating formulation are prepared in preparation for spraying.

Referring now to FIG. 3, an apparatus is shown which is capable of pumping, pressurizing, metering, proportioning, heating and mixing a coating composition with carbon dioxide to form an admixed liquid mixture comprising the coating composition and supercritical carbon dioxide which is present in essentially precisely desired proportions ready for being sprayed. As noted above, while this discussion is specifically focused on carbon dioxide, it is not limited to this material and indeed, any fluid capable of entering its supercrtical state, such as the ones set forth in Table 1, which are suitable for the particular application desired, may also be utilized.

In particular, carbon dio..ide is supplied as a liquid from any suitable source, such as a tank or cylinder which is as denoted as 100 in the drawing. Preferably, the liquid carbon dioxide is supplied on a continuous basis from whatever source is utilized. The liquid carbon dioxide, at its vapor pressure at room temperature (approximately 830 psig) is introduced into a reciprocating pump 110 which in this embodiment is shown as a double-acting piston pump having four check valves.

In the present invention, it has been found that the reciprocating pump used to pump the liquid carbon dixoide is desirably designed for a high feed pressure. The high feed pressure should not cause a change in outlet pressure during a pumping cycle. Liquid carbon dioxide is normally stored in bulk at a temperature of about $-18°$ C. (0° F.) and 300 psig vapor pressure and in a cylinder at room temperature and 830 psig vapor pressure. Accordingly, the feed pressure may vary from 300 to 830 psig, or higher. Some double-acting pump designs (pumps that discharge throughout their cycle and do not stop pumping during the suction part of the cycle) are generally designed for low feed pressures. Consequently, a high feed pressure may affect the forces in the pump and alter the outlet pressure during part of the pumping cycle.

Thus, a typical double-acting three-check-valve piston pump should preferably not be used for pumping the liquid carbon dioxide. Such a pump has an inlet check valve at the bottom, an outlet check valve at the top, and a check valve situated in the piston head, which allows liquid to flow from the bottom compartment to the top compartment when the piston is moving downward. On the downstroke, the inlet check valve closes, fluid flows from the bottom compartment to the top compartment through the check valve in the piston, and fluid flows out the outlet check valve, because the piston rod, which has half the cross-sectional area of the piston, moves into the pump cylinder and reduces its total volume. When the piston moves upward, the check valve in the piston closes, fluid flows out the outlet check valve from the top compartment, and fluid flows in the inlet check valve and fills the bottom compartment. As a result of such operation, this pump is designed for low feed pressure, typically below 100 psig, so that the outlet pressure on the upstroke and downstroke are nearly the same. If this kind of a pump were operated with a high feed pressure of about 830 psig such as that associated with the liquid carbon dioxide, the outlet pressure on the upstroke would be about 1900 psi higher than the outlet pressure on the downstroke since the inlet feed pressure assists the pumping action on the upstroke but not the downstroke. The pressure increase would be twice the feed pressure due to the piston surface area on the inlet side being twice the piston area on the outlet side.

Accordingly, a double-acting piston pump having four check valves which can accomodate a high feed pressure is particularly suitable in the present invention for pressurizing the liquid carbon dioxide. Both the top and bottom compartments of this type of pump each have an inlet and outlet check valve, respectively. The piston does not have a check valve. The piston rod extends through both ends of the cylinder, with packing at both ends. The pump design and operation is symmetrical in the upstroke and downstroke directions, so that the outlet pressure is the same in both parts of the cycle. When the piston moves upward, fluid flows out the upper outlet check valve and fluid flows in the lower inlet check valve simultaneously. When the piston then moves downward, fluid flows out the lower outlet check valve while fluid flows in the upper inlet check valve.

Pump 110 may be driven by any suitable means. An air motor 112 supplied with air from lines 10, 12 and 14, respectively, may be utilized to give pump-on-demand performance. Desirably, a circulating refrigeration system (not shown) is used to cool pump 110 to help avoid cavitation. The carbon dioxide is generally pumped to a pressure of about 1200 to about 2200 psig (above its critical pressure of approximately 1070 psig) for a typical airless spray gun application.

Coating composition is continuously supplied from any suitable source such as a pressure pot 114. Although just one such pot is shown in the drawing, it is understood that a plurality of such pots may be used in series or parallel while others are simultaneously being charged so as to provide the desired continuous flow. The coating composition may first be pumped by a pumping means 116 which in this embodiment is a double-acting three-check-valve reciprocating piston pump which has been described earlier. An air motor 118 supplied with pressurized air from lines 10, 16 and 18, respectively, may be used to drive the pump. Such a reciprocating pump may be used as a supplementary pump when a very thick, viscous and/or abrasive coating composition is being utilized. Otherwise, the coating composition is pumped directly by precision gear pump 126.

After being pressurized by pump 110, the carbon dioxide passes through a coriolis mass flow meter 120 to measure the mass flow rate in a manner described earlier with respect to FIG. 2. The measured mass flow rate is sensed by an electronic receiving device 122 which in turn sends out an electronic signal to electronic ratio controller 124, which have been discussed earlier and operates in the same manner.

Simultaneously, the coating composition is being fed to precision gear pump 126 which is capable of delivering precise amounts of the coating composition on demand.

The ratio controller 124 contains logic circuitry which can be programmed to accept the electronic signal from device 122 and in turn generates a signal to pump 126 to control its speed. Correspondingly, the amount of coating composition that leaves pump 126 is substantially precisely controlled to a predetermined ratio relative to the amount of carbon dioxide measured by mass flow meter 120. The ratio controller works cooperatively with a microprocessor 128 which also receives the mass flow rate information from receiving device 122 and which can also send information to the ratio controller from a precision gear measuring device 130 to which the coating composition passes after being pumped by gear pump 126.

The flow rate measured by measuring device 130 generates a flow feedback signal which is electronically received by the microprocessor 128. The microprocessor compares the actual flow rate that is measured by measuring device 130 with the required flow rate needed to provide the desired ratio of coating composition and carbon dioxide based on its preset programming and sends appropriate electronic instructions to the controller 124 to makes any adjustments needed to the speed of pump 126 so as to obtain that required flow rate.

A general purpose Molytek data logger 135 with mathematical capability may be utilized for data printing and calculations pertaining to the stream characteristics. Additionally, due to the burst mode of spraying that may be associated with the admixed liquid composition, a burst mode signal conditioning module 132 is also preferably utilized to permit evaluation of a single short spray burst, or a series or short spray bursts with interruptions.

After passing through the measuring device 130, the coating composition is heated by heater 134 which desirably is an electric high pressure paint heater in order to reduce its viscosity to aid in the mixing with the carbon dioxide. The heated coating composition is then preferably filtered in fluid filter 136 to remove particulates and fed through a check valve into mixing manifold 138 where it is joined in just the proper proportion with the carbon dioxide after it too has passed through a check valve and into mixing manifold 138.

After the coating composition and carbon dioxide are accurately proportioned together at the mixing manifold, it then enters into a circulation loop generally denoted as 500 in the drawing. The circulation loop continuously pumps, uniformly mixes and heats the mixture of coating composition and carbon dioxide such that the carbon dioxide enters and remains in the supercritical state and, moreover, circulates the now admixed liquid mixture of coating composition and supercritical carbon dioxide passed a spraying means which is capable of spraying the mixture on demand.

Particularly, once having entered the circulation loop 500, the mixture is generally first further mixed by means of a static mixer 140 which helps provide a more uniform blend. The mixture then passes through heater 142 to obtain the desired spray temperature which is above the critical temperature of carbon dioxide (approximately 31° C.) and which provides the carbon dioxide in its supercritical state.

The admixed liquid mixture comprised of the coating composition and supercritical carbon dioxide is then filtered once again in filter 144 and passes through a Jerguson sight glass 146 which is used to examine the phase condition of the admixed liquid mixture. Circulation flow in the circulation loop is obtained through the use of gear pump 148. A pressure relief valve 150 is desirably provided to protect the system from overpressurization.

By the proper opening and closing of valves, the admixed liquid composition may be passed through a spraying device generally denoted as 600 in the drawing which may be operated manually on an on-demand basis by pulling a trigger on an airless or electrostatic airless spray gun, or automatically by a spray gun which may be mounted on a reciprocator (not shown).

Figure 4:
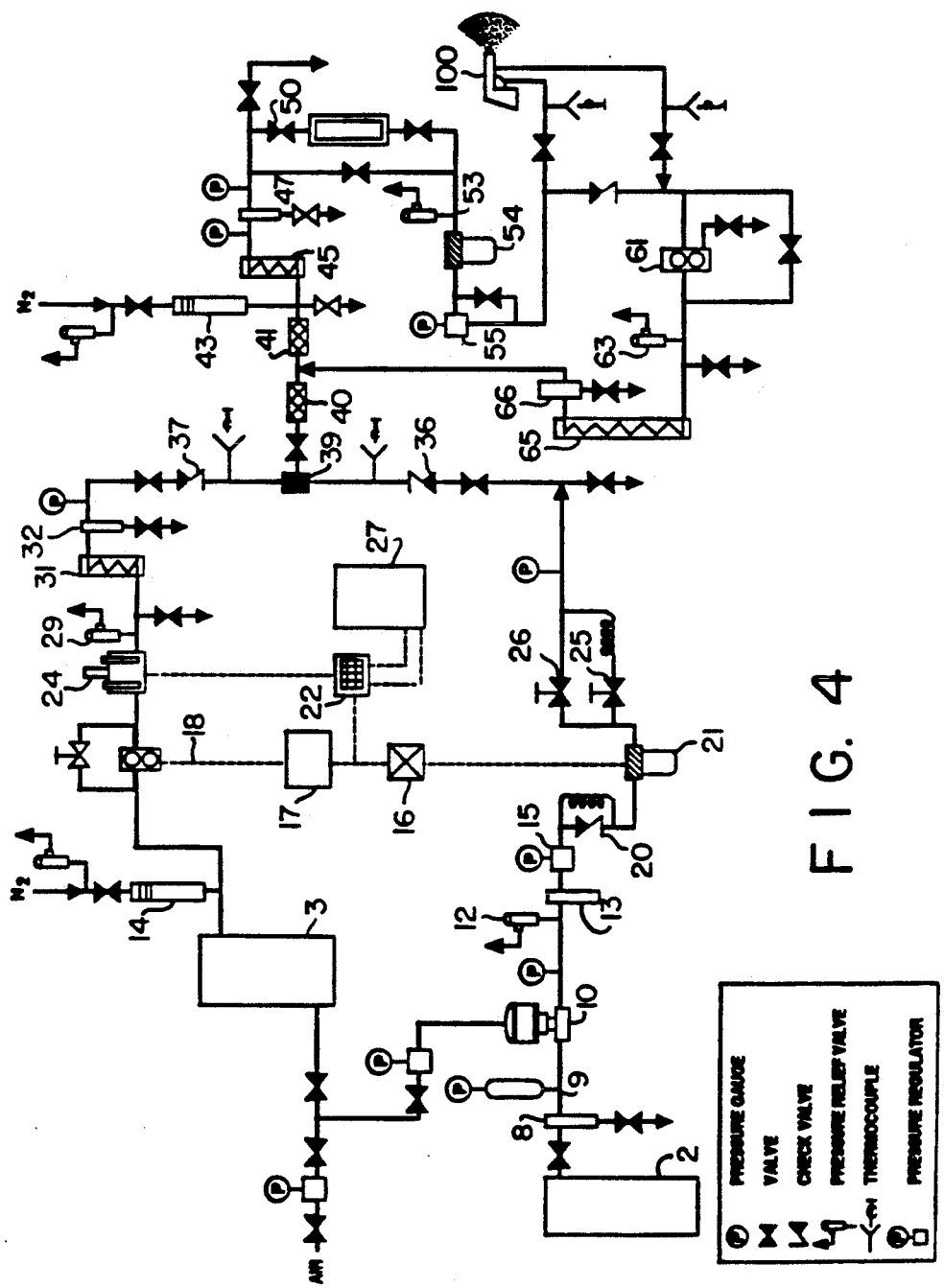
FIG. 4 is a schematic diagram of a more preferred embodiment of the apparatus shown in FIG. 3.

In a more preferred embodiment which is shown in FIG. 4, the carbon dioxide is continuously supplied from a cryogenic carbon dioxide feed system shown generally as 2 in the drawing. The cryogenic carbon dioxide at approximately 300 psig is first fed to an air driven carbon dioxide primer pump (not shown) located at the carbon dioxide feed system 2 (Haskel Inc., Model AGD-15) for initial pressurization. The feed line in between the carbon dioxide source 2 and the primer pump is preferably insulated and also kept refrigerated by bleeding carbon dioxide (approximately ½ lb/hr) through a coil wrapped around the feed line. Surge tank 9 is provided to help damp flow fluctuations in the feed line. The carbon dioxide now having a pressure of between about 1000 to about 1400 psig, and after being filtered by in-line filter 8, is then pressurized to a pressure of about 1600 to about 2300 psig by a carbon dioxide liquid pump 10 (Haskel Inc., Model DSF-35). This liquid pump is a single-acting pump that utilizes a three-way cycling spool that is designed for pumping liquified gases under pressure without requiring refrigeration to avoid cavitation. If desired, in order to help reduce flow fluctuations which may be caused by the single-acting pump, an accumulator (not shown) such as accumulator 43 or even another surge tank, such as surge tank 9, may be utilized immediately after this pump. Moreover, a double-acting pump having four check valves may alternatively be used, if desired. After passing through disposable in-line filter 13, the pressurized carbon dioxide is then regulated down with a pressure regulator 15 (Circle Seal Pressure Regulator) to a steady outlet pressure of about 1300 to about 2000 psig (above its critical pressure) for a typical airless spray gun application.

After being pressurized and regulated, carbon dioxide flows through coriolis meter 21 (Micro Motion, Inc., Model D6) for a true mass flow rate measurement. A capillary tube (1 ft × 1/16 in. OD) and a check valve (25 psi) connected in parallel at 20 is installed prior to the coriolis meter to help avoid a large carbon dioxide flow surge and to smooth down the carbon dioxide flow rate when the liquid pump 10 is activated. A Hoke global valve and a capillary tubing (7 ft × 1/16 in. OD) connected in series at 25 is used to control and restrict the carbon dioxide flow during the initial start-up. After the system is pressurized, another Hoke global valve 26 is opened to allow steady carbon dioxide flow for normal operation. A pressure relief valve 12 (Anderson Greenwood) is used to protect the carbon dioxide system from overpressurization.

The coating composition is fed from a coating supply system generally shown as 3 in the drawing. An accumulator 14 (Tobul, Model 3AT30-2) using nitrogen is utilized to offset any pressure pulsation. The coating flow rate is metered by a precision gear pump 18 (Zenith, Model HLB-5592). Viscous coating from coating supply system 3 is normally pressurized with a booster pump (not shown) to provide sufficient flow through filters and feed lines to the Zenith metering pump to avoid cavitation. Such a booster pump may include a liquid pump similar to the Haskel type pump 10 which, however, does not include a three-way cycling spool. The Zenith pump 18 supplies the positive pressure needed for feeding the coating compositon to the recirculation loop. A precision gear measuring device 24 (AW Co., Model ZHM-02) is used for measuring the flow rate of the coating composition. The speed command of the Zenith pump is electronically controlled by the Zenith Speed Control System 17 that receives the input signal from the Micro Motion remote electronics unit 16. The coating metering rate is electronically adjusted by coating flow feedback signal received from measuring device 24. The desired carbon dioxide mass ratio is therefore maintained when the two feeds are combined at the entrance to the circulation loop at manifold 39. As an alternative embodiment, instead of electronically controlling the Zenith pump, the control system 17 may be made to adjust an air drive control valve (not shown) which would regulate an amount of pressurized air that would be available to a pump air drive system which is connected to the pump.

The coating composition flows through one or more heaters 31 which are connected in series (Binks heaters) and a paint filter 32 (Binks paint filter) before it enters the circulation loop. Pressure relief valve 29 (Anderson Greenwood) is used to protect the coating composition system from overpressurization.

A multi-channel flow computer 22 (AW Co., Model EMO-1005) is used for both instantaneous and cumulative flow rate computation/indication. A general purpose Molytek data logger 27 with mathematical capability provides data printing and calculation functions of the characteristics of the two streams.

The coating composition and carbon dioxide are combined at manifold 39 and passed through a static mixer 40 (Binks) before entering the circulation loop. The check valves 36 and 37 prevent back flow of the two fluids. The combined mixture is then again mixed in another static mixer 41 (Binks) in the circulation loop itself. The mixture is heated and controlled to the desired temperature of between about 40° and about 70° C. in the circulation loop through two respective sets of high pressure heaters 45 and 65, both connected in series. Once heated to this temperature range, the carbon dioxide enters the supercritical state and remains in that state as it is being circulated until it is ultimately sprayed. The mixture also flows through two filters 47 and 66 and is circulated in the loop by a gear pump 61 (Zenith, Model HLB-5592).

An accumulator 43 (Tobul, Model 4.7A30-4) is used to increase the loop capacity and also used to minimize the pressure pulsation in the loop when spray system 100 is activated. Pressure relief valves 53 and 63 (Anderson Greenwood) are used to protect the loop from overpressurization. A sight glass 50 (Jerguson) is used to view the mixture in the loop and observe its phase. A mass flow meter 54 (Micro Motion Inc., Model-D12) is used to monitor the fluid density and flow rate in the circulation loop. The admixed liquid mixture is sprayed onto the substrates from spray system 100.

Figure 5:
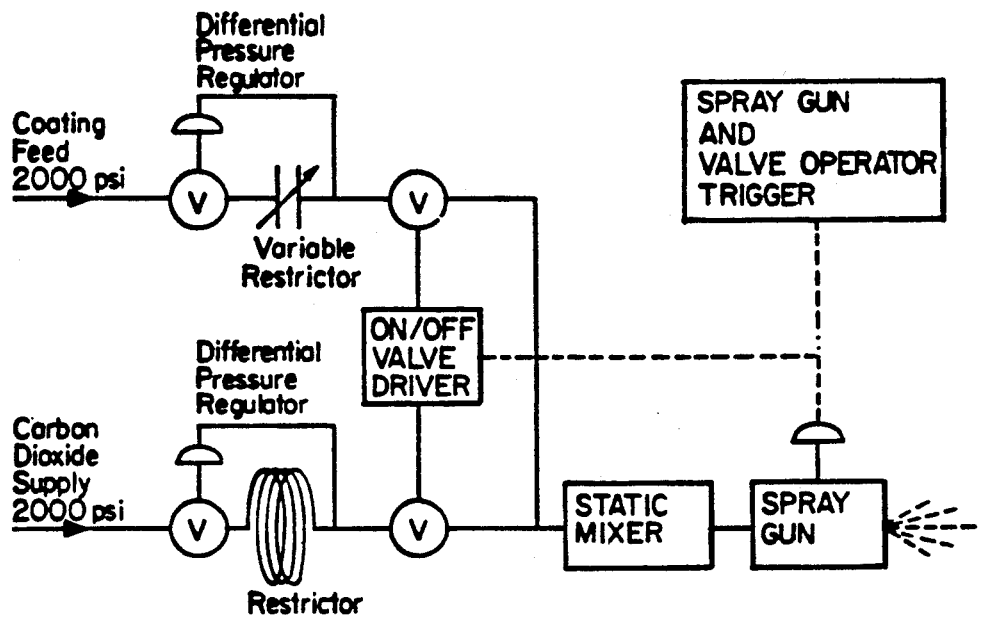
FIG. 5 is a schematic diagram of an alternative embodiment of the present invention for properly proportionating a coating composition and carbon dioxide.

In alternative embodiments of the present invention, as shown in FIG. 5, mass flow controllers (differential pressure control across a restrictor) are used to ratio the proper proportions of supercritical carbon dioxide and coating composition. The components are mixed as they pass through a static mixer prior to usage. For on/off operation with spray guns, valves downstream of each controller can open and close in synchronism with the spray gun valve. Auxiliary systems can maintain all fluid streams at a constant temperature.

Figure 6:
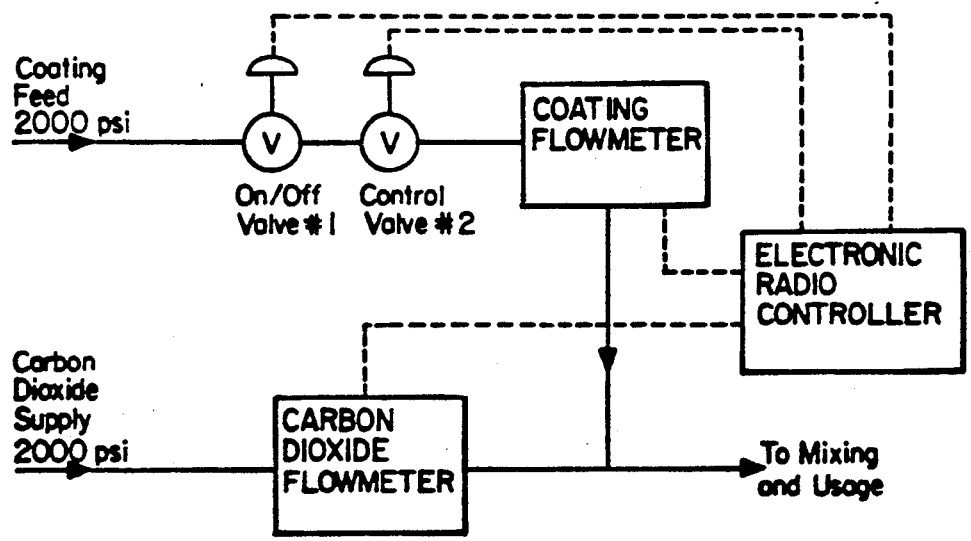
FIG. 6 is a schematic diagram of yet another alternative embodiment of the present invention in which the positive displacement pumps used in the above embodiments is replaced with a two control valve system.

In the embodiments discussed in FIGS. 3 and 4, a positive displacement pump (a Zenith precision gear pump) is used to pump coating composition into the circulation loop. In the alternative embodiment shown in FIG. 6, the positive displacement pump is replaced with two control valves. An electronic ratio controller accepts carbon dioxide flow rate and coating composition flow rate signals from the respective flow meters. It then adjusts control valve #2 until the desired carbon dioxide/coating composition ratio is obtained. On/off valve #1 would automatically close when the carbon dioxide flow rate approaches zero.

EXAMPLES

Example 1

An apparatus for continuosly mixing compressible carbon dioxide fluid with non-compressible coating formulation fluid was assembled according to the schematic diagram shown in FIG. 3. Using the apparatus, compressible carbon dioxide and non-compressible coating formulation were accurately proportioned and pumped on demand to form an admixed liquid mixture that contained the proper concentration of carbon dioxide for spray application of the coating formulation onto a substrate. Compressible liquid carbon dioxide was drawn from a Linde size K cylinder (100) through an eductor tube at room temperature and a pressure of about 830 psig. The carbon dioxide was pressurized to the desired spray pressure of 1600 psig by using a reciprocating double-acting four-check valve piston pump (110) (Graco model 947-963) driven by an air motor (112) (Graco model 207-352). The pump was wrapped in a coil of copper tubing and insulated, and a circulating refrigeration system (not shown) was used to cool the pump to suppress cavitation. The pump pumped carbon dioxide on demand in response to any slight fall off in pressure that occurred at the pump outlet due to spraying. When the unit was not spraying, the pressure at the pump equalized to the pressure at the spray gun and the pump stalled. A coriolis mass flow meter (120) (Micro Motion model D6) was used to measure the mass flow rate of the carbon dioxide. The carbon dioxide flowed into the mixing manifold (138), which was a tubing t-connection, through a check valve. Non-compressible coating formulation (described below) was drawn from a two-gallon pressure pot (114) (Binks model 83-5504) that was pressurized to 50 psig with air. The coating formulation was pressurized to about 1200 psig by using a reciprocating double-acting three-check-valve piston pump (116) (Graco model 207-865) driven by an air motor (118) (Graco model 207-352). The coating formulation was metered by a precision gear pump (126) (Zenith model HMB-5740, 5.5-cc per revolution) at the proper flow rate, in response to the measured mass flow rate of carbon dioxide, to give 28% by weight of carbon dioxide in the admixed liquid mixture. The coating formulation was pressurized by the gear pump to the spray pressure of 1600 psig. The mass flow meter (120) measured the carbon dioxide flow rate and sent a signal from the electronic transducer of the mass flow meter (122) (Micro Motion electronics module) to an electronic ratio controller (124) (Zenith Metering/Control System model QM1726E) that controlled the operating speed of the precision gear pump (126). When the precision gear pump (126) was pumping, the piston pump (116) was activated by the slight fall in pressure at its outlet. When the gear pump was not pumping, the pressure at the gear pump inlet and the pressure at the piston pump outlet equalized and the piston pump stalled. The coating formulation flow rate produced by the gear pump (126) was measured by a precision gear flow meter (130) (AW Company model ZHM-02) to monitor the delivered flow rate, but it was not used for feedback control. The coating formulation was heated in an electric high-pressure paint heater (134) (Binks model 42-6401) and filtered in a high-pressure paint filter (136) (Binks model 107-1065) before flowing into the mixing manifold (138) through a check valve. The combined carbon dioxide and coating formulation flowed from the mixing manifold (138) into the circulation loop (500).

The circulation loop contained a static mixer (140) (Kenics), high-pressure paint heater (142) (Binks model 42-6401), high-pressure paint filter (144) (Binks model 107-1065), high-pressure sight glass (146) (Jerguson model 15-T-32), airless spray gun (Nordson model A7A with circulation), and circulating gear pump (Zenith model HLB-5592, 30-cc per revolution). The admixed liquid mixture was circulated around the loop at high flow rate and heated to a temperature of about 60° C. The spray gun was mounted on a Spraymation automatic sprayer.

The admixed liquid mixture was sprayed and a large number of metal panels were coated with the coating formulation. The apparatus continuously proportioned the compressible carbon dioxide and non-compressible coating formulation at the desired concentration of 28% carbon dioxide in the admixed liquid mixture and maintained the desired spray pressure of 1600 psig. The admixed liquid mixture temperature was maintained at the desired spray temperature of 60° C. at the spray gun. Carbon dioxide flow was initiated on demand by the action of the spray gun spraying and the coating formulation flow was accurately metered in response to the carbon dioxide flow measured by the mass flow meter. The carbon dioxide flow stopped in response to the spray gun ceasing to spray and the coating formulation flow stopped in response to carbon dioxide ceasing to flow.

The non-compressible coating formulation was a clear acrylic coating formulation prepared from Rohm & Haas Acryloid AT-400 resin, which contains 75% non-volatile acrylic polymer dissolved in 25% methyl amyl ketone solvent, and American Cyanamid Cymel 323 resin, which is a cross-linking agent that contains 80% non-volatile melamine polymer dissolved in 20% isobutanol solvent, by mixing the resins with the solvents n-butanol and methyl amyl ketone in the following proportions:

| | |
|---|---|
| Acryloid AT-400 | 8,694.0 g |
| Cymel 323 | 2,718.0 g |
| n-butanol | 626.0 g |
| methyl amyl ketone | 1,336.0 g |
| Total | 13,374.0 g |

The coating formulation contained 65.01% solids fraction and 34.99% solvent fraction, with the following component composition:

| | | |
|---|---|---|
| AT-400 polymer | 6,520.5 g | 48.75% |
| Cymel 323 polymer | 2,174.4 g | 16.26% |
| isobutanol | 543.6 g | 4.07% |
| n-butanol | 626.0 g | 4.68% |
| methyl amyl ketone | 3,509.5 g | 26.24% |
| Total | 13,374.0 g | 100.00% |

The coating formulation had the following properties:

| | | |
|---|---|---|
| Solvent content | 350 | grams/liter |
| Viscosity | 940 | centipoise |
| Liquid density | 999 | grams/liter |

The viscosity of the admixed liquid mixture was about 30 centipoise at spray temperature and pressure.

Example 2

An apparatus for continuosly mixing compressible carbon dioxide fluid with non-compressible coating formulation fluid was assembled according to the schematic diagram shown in FIG. 4. Using the apparatus, compressible carbon dioxide and non-compressible coating formulation were accurately proportioned and pumped on demand to form an admixed liquid mixture that contained the proper concentration of carbon dioxide for spray application of the coating formulation onto a substrate. The coating formulation and spray conditions were the same as those in Example 1. Compressible liquid carbon dioxide was drawn from a Linde size K cylinder (2) through an eductor tube at room temperature and a pressure of about 830 psig. The carbon dioxide was pressurized to about 2000 psig, which is about 400 psi above the desired spray pressure of 1600 psig, by using a reciprocating single-acting piston pump (10) (Haskel model DSF-35) that is driven by an air motor and has a three-way cylcling spool that is designed for pumping liquified gases under pressure. In order to avoid cavitation, the cycling spool allows drive air to power the pump on the pressure stroke only. The return stroke (suction) is driven by the inlet pressure to the pump. No refrigeration was used to cool the pump. The pump pumped carbon dioxide on demand in response to any slight fall off in pressure that occured at the pump outlet due to spraying. The carbon dioxide pressure was then regulated down to the desired spray pressure of 1600 psig by a pressure regulator (15) (Scott high pressure regulator Model 51-08-CS). The pressure regulator allowed carbon dioxide to flow in response to any slight fall off in pressure that occurred at the regulator outlet due to spraying. When the unit was not spraying, the pressure at the regulator outlet equalized to the pressure at the spray gun, so no carbon dioxide flowed from the regulator. Likewise, the pressure at the pump (10) equalized to the pressure at the regulator inlet and the pump stalled. A coriolis mass flow meter (21) (Micro Motion model D6) was used to measure the mass flow rate of the carbon dioxide. The carbon dioxide flowed into the mixing manifold (39), which was a tubing t-connection, through a check valve.

Non-compressible coating formulation was drawn from a two-gallon pressure pot (3) (Binks model 83-5504) that was pressurized to 50 psig with air. The coating formulation was pressurized to about 1600 psig and metered by a precision gear pump (18) (Zenith model HMB-5740, 5.5-cc per revolution) at the proper flow rate, in response to the measured mass flow rate of carbon dioxide, to give 28% by weight of carbon dioxide in the admixed liquid mixture. The mass flow meter (21) measured the carbon dioxide flow rate and sent a signal from the electronic transducer of the mass flow meter (16) (Micro Motion electronics module) to an electronic ratio controller (17) (Zenith Metering/Control System model QM1726E) that controlled the operating speed of the precision gear pump (18). The coating formulation flow rate produced by the gear pump (18) was measured by a precision gear flow meter (24) (AW Company model ZHM-02) to monitor the delivered flow rate, but it was not used for feedback control. The coating formulation was heated in an electric high-pressure paint heater (31) (Binks model 42-6401) and filtered in a high-pressure paint filter (32) (Binks model 107-1065) before flowing into the mixing manifold (39) through a check valve. The combined carbon dioxide and coating formulation flowed from the mixing manifold (39) through a static mixer (40) (Kenics) into a circulation loop.

The circulation loop contained a static mixer (41) (Kenics), an accumulator (43) (Tobul model 4.7A30-4), a high-pressure paint heater (45) (Binks model 42-6401), a high-pressure paint filter (47) (Binks model 107-1065), a high-pressure sight glass (50) (Jerguson model 15-T-32), an airless spray gun (Nordson model A7A with circulation), and a circulating gear pump (Zenith model HLB-5592, 30-cc per revolution). The admixed liquid mixture was circulated around the loop at high flow rate and heated to a temperature of about 60° C. The spray gun was mounted on a Spraymation automatic sprayer. The admixed liquid mixture was sprayed and a large number of metal panels were coated with the coating formulation. The apparatus continuously proportioned the compressible carbon dioxide and non-compressible coating formulation at the desired concentration of 28% carbon dioxide and maintained the desired spray pressure of 1600 psig. The admixed liquid mixture temperature was maintained at the desired spray temperature of 60° C. at the spray gun. Carbon dioxide flow was initiated on demand by the action of the spray gun spraying and the coating formulation flow was accurately metered in response to the carbon dioxide flow measured by the mass flow meter. The carbon dioxide flow stopped in response to the spray gun ceasing to spray and the coating formulation flow stopped in response to carbon dioxide ceasing to flow. Much less fluctuation in spray pressure occurred than in Example 1.

Example 3

The apparatus, operating conditions, and operating procedure were the same as in Example 2, except that the flow rate of the coating formulation as measured by the precision gear meter (24) was used to electronically adjust the speed command of the precision gear metering pump (18) through the speed control system (17) by forming a feedback loop through a flow computer (22) (AW Company, model EMO-1005). In this way the speed of the metering pump (18) is automatically adjusted to compensate for variation in pumping efficiency with pumping speed and pressure. In Example 2, without the feedback control, the average pumping efficiency must be used in calculating the correct pump speed. Feedback control also automatically compensates for changes in metering pump efficiency that occur over time due to wear, especially when pumping abrasive coating formulations. The following metering pump efficiencies were measured as a function of pumping pressure and speed:

| | | Flow Rate, cc/min | | |
|---|---|---|---|---|
| Pressure | Speed | Measured | Theoretical | Efficiency |
| 0 psig | 5 rpm | 26.0 | 27.5 | 94.5% |
| | 10 rpm | 53.7 | 55.0 | 97.6% |
| | 15 rpm | 80.8 | 82.5 | 97.9% |
| 1100 psig | 5 rpm | 23.9 | 27.5 | 86.9% |
| | 10 rpm | 51.5 | 55.0 | 93.6% |
| | 15 rpm | 77.8 | 82.5 | 94.3% |
| | 20 rpm | 104.7 | 110.0 | 95.2% |
| 1500 psig | 5 rpm | 23.4 | 27.5 | 85.1% |
| | 10 rpm | 51.5 | 55.0 | 93.6% |
| | 15 rpm | 77.5 | 82.5 | 93.9% |
| | 20 rpm | 104.0 | 110.0 | 94.5% |

The non-compressible coating formulation was a clear acrylic coating formulation prepared from Rohm & Haas Acryloid AT-400 resin, Rohm & Haas Acryloid AT-954 resin, which contains 80% non-volatile acrylic polymer dissolved in 20% methyl amyl ketone solvent, and Cymel 323 resin, by mixing the resins with the solvents n-butanol, ethyl 3-ethoxypropionate (EEP), methyl amyl ketone, and xylene in the following proportions:

| | |
|---|---|
| Acryloid AT-400 | 6,520.5 g |
| Acryloid AT-954 | 1,917.8 g |
| Cymel 323 | 2,718.0 g |
| n-butanol | 626.0 g |
| EEP | 889.0 g |
| methyl amyl ketone | 320.0 g |
| xylene | 39.0 g |
| Total | 13,030.3 g |

The coating formulation contained 66.73% solids fraction and 32.97% solvent fraction, with the following component composition:

| | | |
|---|---|---|
| AT-400 polymer | 4,890.4 g | 37.53% |
| AT-954 polymer | 1,630.1 g | 12.51% |
| Cymel 323 polymer | 2,174.4 g | 16.69% |
| isobutanol | 543.6 g | 4.17% |
| xylene | 39.0 g | 0.30% |
| n-butanol | 626.0 g | 4.80% |
| methyl amyl ketone | 2,237.8 g | 17.18% |
| EEP | 889.0 g | 6.82% |

| | | |
|---|---|---|
| Total | 13,030.0 g | 100.00% |

The coating formulation had the following properties:

| | | |
|---|---|---|
| Solvent content | 336 | grams/liter |
| Viscosity | 670 | centipoise |
| Liquid density | 1013 | grams/liter |

Example 4

In this example, the apparatus, operating conditions, procedure, and coating formulation were the same as in Example 3 but with the following changes. Carbon dioxide was supplied from an Airco cryogenic cylinder that holds about 380 pounds of carbon dioxide at a pressure of about 300 psig. Liquid carbon dioxide was drawn from the cylinder through an eductor tube. A Haskel single-acting gas booster pump model AG-15 was located at the cryogenic cylinder and was used to pressurize the carbon dioxide feed to the carbon dioxide pump (10) to about 1100 psig, which is above the vapor pressure at room temperature (about 830 psig). The tubing from the cryogenic cylinder to the gas booster pump was insulated and traced with a thin capillary tube with a slow-opening valve at the end that allowed about one-half pound of liquid carbon dioxide per hour to vaporize and bleed off to keep the feed line cold, particularly when carbon dioxide is not flowing, to reduce cavitation in the booster pump. The bleed carbon dioxide was drawn from a t-connection installed at the exit valve of the cryogenic cylinder. A small high-pressure surge tank (9) (Hoke cylinder model 4HDM300, with 300 cc capacity) was installed before the carbon dioxide pump (10) to dampen flow and pressure fluctuations caused by the single-acting booster pump. Using the gas booster pump allowed the cryogenic carbon dioxide feed supply to be utilized without causing the carbon dioxide liquid pump (10) to cavitate. A Precision gear pump (18) (Zenith model HLB-5592, with 10-cc per revolution) with a larger capacity was installed to permit the pump to operate at a slower speed at the same flow rate to reduce the wear rate of the pump.

Example 5

The apparatus, operating conditions, procedure, and coating formulation were the same as in Example 4, except that the feed line from the cryogenic carbon dioxide cylinder to the gas booster pump was not insulated or cooled by the carbon dioxide bleed off through the capillary tube. This caused the gas booster pump to cavitate substantially more so that it had to operate at a much faster speed to deliver the same mass flow rate of carbon dioxide. This caused the gas booster pump to heat the carbon dioxide because of the greater work of compression. The gas booster pump heated the carbon dioxide to a temperature above the critical temperature of 31° C. (to about 40° C.) and pressurized it to a pressure above the critical pressure of 1070 psig (to about 1300 psig), so that the carbon dioxide was a supercritical fluid. The carbon dioxide pump (10) pressurized the supercritical carbon dioxide to 2000 psig. Because supercritical carbon dioxide is much more compressible than liquid carbon dioxide, the work of compression was also greater in the carbon dioxide pump (10), so the carbon dioxide was maintained heated and supercritical as it passed through the pressure regulator (15) and mass flow meter (21) and was mixed with the coating formulation at the mixing manifold (39). Because the carbon dioxide flowed on demand and was not metered or driven, flow and pressure oscillations in the carbon dioxide feed line caused by compressibility did not occur. The apparatus performed as well as it did when compressible liquid carbon dioxide was in the feed system instead of compressible supercritical carbon dioxide. In subsequent operation, the phase condition of the carbon dioxide in the feed system was varied widely from liquid to gaseous to combined liquid and gaseous flow with and the apparatus continued to proportionate and pump well despite the different and varying phase conditions.

Example 6

The apparatus, operating conditions, procedure, and coating formulation were the same as in Example 4, except that the single-acting gas booster pump was replaced by a double-acting gas booster pump (Haskel model AGD-15) with four check valves. This further reduced pressure fluctuations in the feed line to carbon dioxide pump (10).

Example 7

The apparatus, operating conditions, procedure, and coating formulation were the same as in Example 4, except that a capilliary tube (1 ft × 1/16 inch OD) and a spring-loaded check valve with a 25-psi opening pressure (20) were installed in parallel in the carbon dioxide feed line between the pressure regulator (15) and the coriolis mass flow meter (21). This helped to avoid large and sudden carbon dioxide flow surges when the carbon dioxide flow begins suddenly on demand. Carbon dioxide flow is limited to the capillary tube until the pressure drop exceeds 25 psi, which opens up the check valve so that larger amounts of carbon dioxide can flow, after flow has already initiated through the capillary tube. Therefore, the precision gear meter does not have to instantly respond to a step-change or sharp pulse in carbon dioxide flow rate, so that smoother and more accurate proportioning control is obtained.

Example 8

The apparatus of Example 2 was used to proportion compressible carbon dioxide with a non-compressible coating formulation that gives a clear acrylic coating that requires no cross-linking or baking. The coating formulation was prepared from Rohm & Haas Acryloid B-66 resin by dissolving the resin in methyl amyl ketone solvent. The coating formulation contained 35.00% polymer fraction and 65.00% solvent fraction and had the following properties:

| | | |
|---|---|---|
| Solvent content | 584 | grams/liter |
| Viscosity | 316 | centipoise |
| Liquid density | 898 | grams/liter |
| Molecular weight | 45,290 | weight average |

The admixed liquid mixture had a high carbon dioxide content of 42% by weight and was sprayed at a pressure of 1600 psig and temperatures of 60° C. and 70° C., which gave a clear single-phase solution. The spray viscosity was about 20 centipoise (60° C.) Numerous panels were sprayed and coated with the coating formulation by using the Spraymation automatic sprayer.

Example 9

The same apparatus and coating material was used as in Example 8, except that the coating formulation contained a higher concentration of polymer, namely 44% Acryloid B-66 dissolved in methyl amyl ketone solvent, and therefore had a much higher viscosity. The coating formulation had the following properties:

| | |
|---|---|
| Solvent content | 516 grams/liter |
| Viscosity | 1060 centipoise |
| Liquid density | 922 grams/liter |
| Molecular weight | 45,290 weight average |

The admixed liquid mixture had a high carbon dioxide content of 42% and was sprayed at a pressure of 1600 psig and temperatures of 60° C. and 70° C., which gave clear single-phase solutions but were near the solubility limit. Numerous panels were sprayed and coated by using the Spraymation automatic sprayer.

Example 10

The same apparatus was used as in Example 2. A coating formulation that gives a clear acrylic coating was prepared from Acryloid AT-400 resin, Acryloid AT-954 resin, and Cymel 323 resin, by mixing the resins with the solvents n-butanol, ethyl 3- ethoxypropionate (EEP), methyl amyl ketone, methyl ethyl ketone, and xylene and with Union Carbide silicone surfactant L5310 dissolved in xylene in the following proportions:

| | |
|---|---|
| Acryloid AT-954 | 1,197.9 g |
| Acryloid AT-400 | 4,072.9 g |
| Cymel 323 | 1,697.8 g |
| n-butanol | 391.0 g |
| EEP | 555.3 g |
| methyl amyl ketone | 199.9 g |
| methyl ethyl ketone | 2,860.8 g |
| xylene | 24.4 g |
| 50% L5310 in xylene | 32.9 g |
| Total | 11,032.9 g |

The coating composition contained 49.23% solids fraction and 50.77% solvent fraction. The admixed liquid mixture was sprayed at a temperature of 60° C. and a pressure of 1600 psig at carbon dioxide concentrations of 14%, 20%, and 25% by weight, which demonstrated stable and accurate proportioning at low levels of carbon dioxide.

Example 11

Using the apparatus of Example 2 and the coating formulation of Example 3, compressible carbon dioxide and non-compressible coating formulation were proportioned continuously on demand to produce an admixed liquid mixture with a carbon dioxide content of 29.5% by weight at spray pressures of 1350, 1600, and 1950 psig and spray temperatures of 55 C. and 60 C. Numerous panels were sprayed and coated at each condition. This demonstrated stable and accurate proportioning over a range of pressure.

Example 12

The apparatus of Example 2 was used to proportion compressible carbon dioxide with a non-compressible coating formulation that gives a clear polyester coating. The coating formulation was prepared from Spencer Kellog Aroplaz 6025-A6-80 resin, which contains 80% nonvolatile polyester polymer dissolved in 20% methyl PROPASOL acetate (MPA) solvent, and Cymel 323 resin, by mixing the resins with the solvents n-butanol and butyl CELLOSOLVE acetate (BCA) and with surfactant in the following proportions:

| | |
|---|---|
| Aroplaz 6025-A6-80 | 11,000.0 g |
| Cymel 323 | 3,666.7 g |
| n-butanol | 450.0 g |
| BCA | 2,250.0 g |
| 50% L5310 in xylene | 75.0 g |
| Total | 17,441.7 g |

The coating formulation contained 67.27% solids fraction and 32.73% solvent fraction, with the following component composition:

| | | |
|---|---|---|
| Aroplaz polymer | 8,800.0 g | 50.45% |
| Cymel 323 polymer | 2,933.4 g | 16.82% |
| isobutanol | 733.3 g | 4.20% |
| xylene | 37.5 g | 0.22% |
| n-butanol | 450.0 g | 2.58% |
| MPA | 2,200.0 g | 12.61% |
| BCA | 2,250.0 g | 12.90% |
| L5310 | 37.5 g | 0.22% |
| Total | 17,441.7 g | 100.00% |

The coating formulation had the following properties:

| | |
|---|---|
| Solvent content | 360 grams/liter |
| Viscosity | 990 centipoise |
| Liquid density | 1111 grams/liter |

An admixed liquid mixture with a carbon dioxide content of 25.5% was sprayed at a temperature of 70° C. and pressure of 1600 psi, which gave a clear single-phase solution. Numerous panels were sprayed and coated using a Spraymation automatic sprayer.

Example 13

The apparatus of Example 4 was used to proportion compressible carbon dioxide with a non-compressible coating formulation that gives a clear air-dry alky coating. The coating formulation was prepared by dissolving an alkyd resin with lesser amounts of acrylic and polyester resins in xylene, methyl isobutyl ketone (MIBK), mineral spirits, and other solvents. To the precursor coating composition was added 0.06% zirconium and 0.02% cobalt hardeners (based on resin weight) before spraying. The precursor coating composition contained 51.46% solids fraction and 48.54% solvent fraction, with the following component composition:

| | | |
|---|---|---|
| alkyd resin | 3,711.9 g | 40.14% |
| acrylic resin | 713.8 g | 7.72% |
| polyester resin | 333.1 g | 3.60% |
| MIBK | 386.3 g | 4.18% |
| xylene | 2,032.5 g | 21.98% |
| n-butyl propionate | 138.0 g | 1.49% |
| methyl amyl ketone | 386.3 g | 4.18% |
| n-pentyl propionate | 138.0 g | 1.49% |
| mineral spirits | 1,407.1 g | 15.22% |
| Total | 9,247.0 g | 100.00% |

The coating formulation had the following properties:

| | | |
|---|---|---|
| Solvent content | 467 | grams/liter |
| Viscosity | 240 | centipoise |
| Liquid density | 964 | grams/liter |
| Molecular weight | 25,550 | weight average |

An admixed liquid mixture with a carbon dioxide content of 30.5% was sprayed at a temperature of 69° C. and pressure of 1600 psi. Numerous panels were sprayed and coated.

Example 14

The apparatus of Example 4 was used to proportion compressible carbon dioxide with a non-compressible coating formulation that was similar to that of Example 13 except that it was pigmented to give a black air-dry alkyd coating. Admixed liquid mixtures were sprayed with different carbon dioxide contents that ranged from 15% to 23% by weight. Spraying pressure ranged from 1200 psi to 1600 psi. Spray Temperature ranged from 40° C. to 60° C. Numerous panels were sprayed and coated at each condition by using a Spraymation automatic sprayer.

Example 15

The apparatus of Example 2 was used to proportion compressible carbon dioxide with a non-compressible coating formulation that gives a clear cellulose acetate butyrate coating that requires no cross-linking or baking. The coating formulation was prepared by dissolving Eastman Chemical Cellulose Ester CAB-381-0.1 in solvents methyl amyl ketone, methyl ethyl ketone, and butyl CELLOSOLVE acetate (BCA). The coating formulation contained 25.00% solids fraction and 75.00% solvent fraction, with the following component composition:

| | | |
|---|---|---|
| CAB | 4,800.0 g | 25.00% |
| methyl ethyl ketone | 4,480.0 g | 23.33% |
| methyl amyl ketone | 6,720.0 g | 35.00% |
| BCA | 3,200.0 g | 16.67% |
| Total | 19,200.0 g | 100.00% |

The coating formulation had the following properties:

| | | |
|---|---|---|
| Solvent content | 678 | grams/liter |
| Viscosity | 347 | centipoise |
| Liquid density | 905 | grams/liter |
| Molecular weight | 45,260 | weight average |

An admixed liquid mixture with a carbon dioxide content of 36% was sprayed at a pressure of 1600 psig and a temperature of 60 C., which gave a clear single-phase solution. Numerous panels were sprayed and coated using a Spraymation automatic sprayer.

Example 16

The apparatus of Example 2 was used to proportion compressible carbon dioxide with a non-compressible coating formulation that gives a clear acrylic coating. The coating formulation was prepared from Acryloid AT-400 resin and Cymel 323 resin by mixing the resins with the solvents n-butanol, ethyl 3-ethoxypropionate (EEP), xylene, butyl CELLOSOLVE acetate (BCA), and aromatic 100 in the following proportions:

| | |
|---|---|
| Acryloid AT-400 | 8,694.0 g |
| Cymel 323 | 2,718.0 g |
| n-butanol | 265.0 g |
| EEP | 450.0 g |
| xylene | 312.0 g |
| aromatic 100 | 30.0 g |
| BCA | 20.0 g |
| 1% L5310 in xylene | 10.0 g |
| Total | 12,499.0 g |

The precursor coating composition contained 69.56% solids fraction and 30.44% solvent fraction, with the following component composition:

| | |
|---|---|
| AT-400 polymer | 6,520.5 g |
| Cymel 323 polymer | 2,174.4 g |
| isobutanol | 543.6 g |
| n-butanol | 265.0 g |
| methyl amyl ketone | 2,173.5 g |
| EEP | 450.0 g |
| xylene | 321.9 g |
| aromatic 100 | 30.0 g |
| BCA | 20.0 g |
| L5310 | 0.1 g |
| Total | 12,499.0 g |

The coating formulation had the following properties:

| | | |
|---|---|---|
| Solvent content | 312 | grams/liter |
| Viscosity | 3500 | centipoise (60 rpm) |
| | 2400 | centipoise (6 rpm) |
| Liquid density | 1025 | grams/liter |

An admixed liquid mixture with a carbon dioxide content of 30% was sprayed at a temperature of 67 C. and a pressure of 1900 psig, which gave a clear single-phase solution. Numerous panels were sprayed and coated using a Spraymation automatic sprayer. This illustrates stable and accurate proportionation using a highly viscous coating formulation.

Example 17

An apparatus for continuously mixing compressible carbon dioxide fluid with non-compressible coating formulation fluid was assembled in similar fashion to that described in Example 2 and shown in FIG. 4 along with the attributes described in Examples 3 and 4, except that the apparatus was built on a much larger scale such that it could supply twelve spray guns spraying simultaneously instead of one or two guns. In particular, the pump sizes were bigger. The gas booster pump used to supply carbon dioxide from a cryogenic cylinder (2) was a Haskel double-acting gas booster model 8AGD-14 with four check valves. The carbon dioxide pump (10) was a Haskel double-acting liquid pump model 8DSFD-25 with four check valves. The precision gear pump (18) was a Zenith model HLB-5592 with 20 cc per revolution and accompanying speed control unit (17). The circulation gear pump (61) was a Zenith model HXB-4980 with 147.5 cc per revolution. The mass flow meter (21) was a Micro Motion model DH-012-5-100. In addition, three paint heaters (31) were used to preheat the coating formulation and several paint heaters (45, 65) were used to heat the circulation loop. The additional heaters were used to increase the heat transfer area and to provide greater heating capacity. Other components such as tube sizes, fittings, valves, and filters were scaled up accordingly. The large-scale apparatus was used to proportion the coating formulations given in Examples 3 and 14 at the conditions already described. Admixed liquid mixtures were sprayed at a high rate and large volume, and numerous panels were coated, which demonstrated stable and accurate proportioning in large-scale use.

What is claimed is:

1. An apparatus for mixing a substantially compressible fluid and a substantially non-compressible fluid in a predetermined proportion which consisting essentially of:
    a) means for supplying substantially compressible fluid;
    b) instantaneously measuring the mass flow rate of the substantially compressible fluid at a point prior to mixing with said non-compressible fluid through the use of a Coriolis mass flow meter;
    c) means for generating a signal in response to the measured mass flow rate of the substantially compressible fluid;
    d) means for supplying substantially non-compressible fluid;
    e) means for controlling the flow rate of the substantially non-compressible fluid responsive only to the signal generated in (c); and
    f) means for forming a mixture of the measured compressible fluid and the controlled non-compressible fluid in the predetermined proportionation.

2. The apparatus of claim 1, wherein the means for supplying the compressible fluid comprises a double-acting, four check valve reciprocating pump.

3. The apparatus of claim 1, wherein the means for supplying the compressible fluid comprises an air driven, single-acting reciprocating pump having a three-way cycling spool.

4. The apparatus of claim 3, wherein a flow-dampening means is provided between the single-acting reciprocating pump and the means for measuring the mass flow rate of the compressible fluid.

5. The apparatus of claim 1, wherein the means for supplying the non-compressible fluid comprises a double-acting, reciprocating pump.

6. The apparatus of claim 1, wherein the means for supplying the non-compressible fluid comprises a single-acting pump.

7. The apparatus of claim 1, wherein the means for controlling the flow rate of the non-compressible fluid includes a positive displacement pump.

8. The apparatus of claim 7, wherein the positive displacement pump is a precision gear pump.

9. The apparatus of claim 1, wherein the means for forming the mixture of compressible and non-compressible fluids is a mixing manifold.

10. The apparatus of claim 9 which further includes a static mixer after the mixing manifold.

11. A method for forming a mixture of a substantially compressible fluid and a substantially non-compressible fluid in a predetermined proportion which consisting essentially of:
    a) supplying substantially compressible fluid;
    b) measuring the mass flow rate of the substantially compressible fluid on an instantaneous basis;
    c) generating a signal in response to the measured mass flow rate of the substantially compressible fluid;
    d) supplying substantially non-compressible fluid;
    e) controlling the flow rate of the substantially non-compressible fluid responsive to the signal general in (c); and
    f) forming a mixture of the measured compressible fluid and the controlled non-compressible fluid in the predetermined proportionation,
    with the proviso that only the mass flow rate of the substantially compressible fluid is measured.

* * * * *